(12) United States Patent
Arroitajauregui Dorta

(10) Patent No.: US 12,217,563 B2
(45) Date of Patent: Feb. 4, 2025

(54) ACCESS CONTROL METHOD AND SYSTEM

(71) Applicant: LALIGA CONTENT PROTECTION, SL, Madrid (ES)

(72) Inventor: Yeray Arroitajauregui Dorta, Madrid (ES)

(73) Assignee: LALIGA CONTENT PROTECTION, SL, Madrid (ES)

( * ) Notice: Subject to any disclaimer, the term of this patent is extended or adjusted under 35 U.S.C. 154(b) by 0 days.

(21) Appl. No.: 18/272,431

(22) PCT Filed: Jul. 19, 2022

(86) PCT No.: PCT/ES2022/070472
§ 371 (c)(1),
(2) Date: Jul. 14, 2023

(87) PCT Pub. No.: WO2023/052659
PCT Pub. Date: Apr. 6, 2023

(65) Prior Publication Data
US 2024/0331475 A1   Oct. 3, 2024

(30) Foreign Application Priority Data
Sep. 28, 2021   (ES) .................. P202130906

(51) Int. Cl.
G07C 9/27     (2020.01)
G07C 9/00     (2020.01)
G07C 9/10     (2020.01)

(52) U.S. Cl.
CPC .......... *G07C 9/27* (2020.01); *G07C 9/00309* (2013.01); *G07C 9/10* (2020.01)

(58) Field of Classification Search
CPC ......... G07C 9/27; G07C 9/10; G07C 9/00309
USPC .......................................... 235/382
See application file for complete search history.

(56) References Cited

U.S. PATENT DOCUMENTS

| | | | |
|---|---|---|---|
| 2007/0200665 A1* | 8/2007 | Studerus .................. | G07C 9/27 340/5.5 |
| 2008/0290989 A1* | 11/2008 | Kudelski .................. | G07C 9/28 340/5.7 |
| 2012/0068818 A1* | 3/2012 | Mizon ...................... | G07C 9/20 340/5.61 |
| 2012/0188054 A1* | 7/2012 | Bongard ............ | G07C 9/00571 340/5.2 |
| 2014/0229246 A1* | 8/2014 | Ghaffari ............. | G06K 7/10237 705/13 |
| 2018/0268238 A1* | 9/2018 | Khan ................... | G06V 10/751 |

(Continued)

*Primary Examiner* — Allyson N Trail
(74) *Attorney, Agent, or Firm* — Sughrue Mion, PLLC

(57) ABSTRACT

The invention describes an access control method for a spectator to a facility, wherein a spectator's mobile device (1) has installed an application configured to communicate with a validation server (2), and wherein said validation server (2) is configured to communicate with some automatic access gates (3) to the facility. The method comprises the calculation by applying an access code (EC) that includes a first measurement of a physical variable carried out by a sensor of the mobile device (1) and the calculation by the access gate (3) of an validation code (VC) that includes a second measurement of the physical variable carried out by a sensor located in the facility. Access is only granted if the access code (EC) coincides with the validation code (VC).

20 Claims, 3 Drawing Sheets

(56) References Cited

U.S. PATENT DOCUMENTS

| | | | |
|---|---|---|---|
| 2020/0134332 A1* | 4/2020 | Vossoughi | G08G 1/146 |
| 2021/0119764 A1* | 4/2021 | Meghji | H04L 9/3239 |
| 2022/0070167 A1* | 3/2022 | Adams, Jr. | G06F 21/30 |
| 2023/0154261 A1* | 5/2023 | DeMattio | G07C 9/27 |
| | | | 340/5.61 |
| 2024/0194011 A1* | 6/2024 | Hess | G07C 9/25 |
| 2024/0203185 A1* | 6/2024 | Igarashi | G07C 9/00309 |
| 2024/0221422 A1* | 7/2024 | Nam | G06V 40/172 |

\* cited by examiner

ACCESS CONTROL METHOD AND SYSTEM

OBJECT OF THE INVENTION

A first object of the present invention is a method designed to securely control the access to facilities, for example in the context of a sporting or musical event or any type of show.

A second object of the invention is a system particularly designed to carry out the above method.

BACKGROUND OF THE INVENTION

Currently, the need to control access to facilities where various types of events take place, such as sporting events, concerts, or shows, is known.

Not long ago, access to such facilities was controlled by means of physical tickets, that is, tickets printed on a paper support or similar and provided with an entry code, for example a barcode or a QR code. In this way, at the entrance to the facility, some optical readers read the entry code and, via communication with a server where the validly issued entry codes are stored, the entry is validated to allow access to the event. However, this type of control systems have the drawback that people without a ticket can gain access to the event by showing copies of a valid ticket, for example photocopies or home prints. In addition, they do not allow controlling the identity of the person who accesses the event, since the physical ticket can be carried by anyone.

Afterwards, the tickets began to have electronic support. In this case, the spectator purchases the ticket through a web page and the ticket is downloaded, which similarly to the previous case has a QR code or the like. Thus, when he/she is going to access the event, the spectator shows the ticket through the mobile phone screen, so that the code is read by the reader located at the entrance to the facility to allow or deny access. This access control system is essentially equivalent to the previous one, although it has the advantage that the purchase of the ticket does not require a physical ticket office. However, as in the previous case, making copies of the ticket may be enough to fraudulently access the event.

For the purpose of improving security, a system in which the spectator buys the ticket through a certain application installed on his/her mobile phone is also known. When the purchase is made, the application generates a code that includes some data directly related to the mobile phone from which the purchase is made, such as the telephone number or the like. Simultaneously, the access control system server that is in communication with the entrance turnstiles generates a code in the same way. When the spectator accesses the event, the turnstile checks both codes to allow or deny access. This configuration has the advantage that the generated code is uniquely related to the phone from which it was generated. However, it is still susceptible to fraud by taking screen impressions and sending it to other spectators.

In order to prevent this type of fraud, it is known a method in which the application calculates successive versions of the entry code, each of which has a predetermined duration. This can be done, for example, by adding a timestamp to the code, according to a known method in this field. So, for example, the application could calculate a new version of the entry code every 20 seconds. By properly synchronizing the calculation of the entry code from the server side, the code calculated by the application that the spectator shows to the entrance turnstile will be the same as the one calculated by the server at that specific moment, and therefore the entry is validated. However, although this makes it difficult for spectators to copy and send the entry code to another person, it is not impossible that this fraud could work if they send the entry code quickly enough to a person simultaneously located at another gate from the same facility.

In the light of the above, there is currently a need in this technical field for access control systems that are more secure and more difficult to manipulate.

DESCRIPTION OF THE INVENTION

The present invention solves the previous problems thanks to an access control method and system that uses an entry code that, in addition to being dependent on the moment in which it is generated thanks to the addition of a timestamp, is also dependent on the place in which it is generated. To do this, a set of symbols or characters that directly depend on some physical variable present in the place where the code is generated is added to the entry code, for example next to the access gate to the facilities where the spectator is at that moment. In this way, it is possible to ensure that the entry code that the spectator shows when accessing the facilities has been validly calculated by the ticket purchase and management application at the same time and place, completely avoiding the possibility of fraud through copies, printing or sending of a valid code from some remote location away from the facility.

Some terms that are used throughout the description of the present invention are described below.

Event: Any type of sporting, musical, or artistic event for which it is necessary to control access to a certain facility.

Facility: Physical place and with controlled access in which the event takes place, such as a stadium, a theatre, a concert hall, or others.

Mobile device: Any type of device on which a specific application can be installed to purchase tickets for sporting, musical, or artistic events. It includes not only mobile phones, but also tablets, smartwatches, and any other known similar devices. A mobile device of any of these types has a plurality of embedded sensors capable of detecting various physical variables.

Server: Electronic device with communication, processing, and data storage capacity. It can be a single physical device or it can be divided into several separate physical devices that communicate with each other. For example, it can consist of a first physical device that carries out processing tasks plus a second physical device that constitutes a database. It is also possible that, for legal or commercial reasons not relevant to the invention, the server is divided into several separate physical devices, each of which carries out a particular part of the tasks defined herein.

Automatic access gate: Any type of gate, turnstile, barrier, or similar configured to automatically allow or deny access to the facility where the event takes place by opening or closing an obstacle that physically prevents the passage of the spectator. The automatic access gate has a means of communication with the mobile device, for example a QR code reader, as well as a means of communication with the server. In particular, the automatic access gate is configured to read the QR code of the spectator's ticket, send said code to the server, and allow or deny access to the facility based on receipt of an order to grant or deny access by the server.

Application: Any type of program or code set that can be installed and/or run on the mobile device to make it carry out a certain series of operations. In this context, it is an application for purchasing and managing tickets for sporting, musical, or artistic events that communicates via web software with other entities involved in the purchase process. The application contains a time-limited entry code generation algorithm.

Code: Any set of symbols or characters, whether textual or visual, used to control access to the facility where the event takes place. For example, an alphanumeric code, a barcode, a QR code, or any other may be used.

Timestamp: Time frame, also known as a time record, time-stamping, or timestamp, which generally consists of a sequence of characters denoting the date and/or time at which an access code is generated. It is used for the generation of codes that change as a function of time, i.e. to generate a sequence of codes of limited time duration.

Access Control Method

A first aspect of the present invention describes a method for controlling access of a spectator to a facility. To carry out this method, a spectator's mobile device has installed an application configured to communicate with a validation server which, in turn, is configured to communicate with some automatic access gates to the facility. This method basically comprises the following steps:

1. Generation and sending of the seed

One of the application of the mobile device and the validation server generates a seed that constitutes a first portion of an entry code, and sends said seed to the other of the application of the mobile device and the validation server.

That is, in this first step, the spectator first installs a ticket purchase and management application on his/her mobile device and then carries out a process to purchase a ticket. Once the purchase is confirmed, the mobile device or the validation server generates a seed that will constitute a first portion of the entry code. For example, the first portion of the entry code can be directly the seed itself, or else some data obtained from it by means of a known predetermined algorithm or method. The generated seed is sent to the other entity between the mobile device and the validation server, that is, to that entity of the two that has not generated it. Thus, at the end of this step, the seed is known by both entities.

2. Sending of the mobile device's identification data

The mobile device sends identification data of the mobile device itself to the validation server. When the mobile device is a mobile telephone, this data may be, for example, one or more of the telephone number (N), the International Mobile Subscriber Identity (IMSI), and/or the International Mobile Equipment Identity (IMEI).

This step does not need to be after the step described above, but can be done simultaneously or even in advance. For example, data from the mobile device can be sent to the server during the installation operations of the ticket management and purchase application on the mobile device, and therefore prior to the generation of the seed itself that is would occur later during the ticket purchase process. Alternatively, in the event that the seed is generated by the mobile device's application itself once the ticket purchase has been confirmed, the mobile device data can be sent to the server simultaneously with the sending of the seed.

In any case, the end result of these first two steps of the method is that the seed and the identification data of the mobile device on which the ticket management and purchase application is installed are known for both the validation server and the application installed on the mobile phone.

3. Calculation of the entry code using a first measurement of a physical variable of the surroundings of the mobile device The application of the mobile device calculates an entry code of limited time duration comprising the seed, identification data of the mobile device and at least one first measurement of a physical variable of the environment of the mobile device obtained at that moment by means of a sensor embedded in said mobile device. Note that the entry code is not required to include only a single measurement of a physical variable, but could include several measurements of different physical variables.

In principle, the physical variable of the surroundings of the mobile device can be any as long as it can be obtained by means of one of the sensors conventionally embedded in current mobile devices such as smartphones and the like. This includes detectable parameters that go beyond what is strictly understood by the term "physical variable", such as number of identified Wi-Fi, or others. Thus, in a particularly preferred embodiment of the invention, the physical variable of the surroundings of the mobile device is chosen from among the following: identified Wi-Fi, signal strength emitted by a radio device, signal strength emitted by a Bluetooth device, signal strength emitted by a Bluetooth Low Energy device, cell ID of a mobile phone antenna, GPS positioning coordinates, GPS positioning quadrant, visible satellites used in GPS positioning, atmospheric pressure, wind speed, temperature, humidity, air conductivity, air salinity, gravity, altitude, acoustic intensity, biometrics, orientation, luminosity, infrared spectrum, air quality, and vibrations.

In short, this third step of the method of the invention takes place when the spectator is going to access the facility where the event takes place. At that moment, the spectator opens the application to obtain the entry code, for example a QR code that he/she will show to an optical reader connected or embedded in the automatic access gate. Said entry code that will be shown to the automatic access gate is automatically generated at that moment by the application, and includes the seed (or data obtained from it), mobile device's identification data, and at least a first measurement of a predetermined physical variable of the surroundings of the mobile device obtained by a sensor of the mobile device itself. The algorithm used to generate said entry code is embedded in the mobile phone's application itself or, in any case, has been transmitted in advance to the mobile phone from the server.

The entry code further includes a timestamp obtained periodically at known and predetermined time frames. For example, the timestamp included in the entry code can change every 10 or 20 seconds, thus providing enough time for the system to perform all the necessary steps for validation. The duration of the entry code can be adjusted to ensure a correct operation of the invention. As described herein above, the use of time-limited entry codes by adding timestamps is already known in this field, and for that reason its use is not described in detail.

4. Entry code presentation at the access gate

When the mobile device communicates the entry code to the automatic access gate, the automatic access gate sends a validation request that includes said entry code to the validation server. Thus, upon receiving the entry code, the automatic access gate triggers the start of the process described below for the validation of such entry code.

Note that, although the examples described herein specifically speak of optical communication in the form of reading a QR code, the communication between the mobile device and the automatic access gate may, in principle, be carried out in any manner known in the art. For example, one of the following may be used: QR, NFC, Bluetooth, Bluetooth Low Energy, Wi-Fi, IP, and infrared.

5. Obtaining a second measurement of the physical variable

At the same time that the previous step is carried out, that is, when the mobile device communicates the entry code to the automatic access gate, a sensor located in the facility carries out a second measurement of the physical variable and communicates it to the validation server. The purpose of acquiring this second measurement of the physical variable is to allow the subsequent validity verification of the entry codes shown by the spectators to the automatic access gates in the manner described in detail below. In particular, access will only be allowed when, among other considerations, both measurements coincide.

According to a preferred embodiment of the invention, for the acquisition of the second measurement of the physical variable, it could be used a single sensor, regardless of the number of automatic access gates, common for the entire facility to which access is sought.

For example, if a physical variable such as temperature or atmospheric pressure is considered, it can be assumed that its value will be constant at all points of the facility where the access gates to a soccer stadium are located. That is, the value of the first temperature or pressure measurement taken by the spectator's mobile device in the surroundings of a certain automatic access gate will coincide with the value of the second temperature or pressure measurement taken by the sensor located at any other point in the facility. Thus, in this case, a single sensor would suffice to check the validity of the entry codes shown through all the automatic access gates to the facility.

Alternatively, several sensors in the surroundings of the respective automatic access gates, or in the surroundings of certain sets of automatic access gates located in the same area of the facility, could be used. In this context, the surroundings of a gate can cover a maximum distance from the access gate of a few meters, preferably less than meters, more preferably less than 5 meters, and even more preferably less than 2 meters. This ensures that, in the case of certain limited-range physical variables, the second measurement obtained by the sensor corresponding to an automatic access gate when the spectator shows the entry code to the gate coincides with the first measurement made by the spectator's mobile device located next to said automatic access gate when opening the application a few seconds before. Naturally, it is understood that both the physical variable and the degree of precision of the measurement (for example, number of significant figures of the measurement) will be selected in such a way as to ensure the coincidence between both measurements when these are taken from points not separated by more than a few meters. In addition, the calculation by the application of successive entry codes of limited time duration ensures that the code shown to the gate has not been generated long before and therefore that the spectator was close to the gate when it was generated.

For example, if the number of Wi-Fi signals available or their strength, the cell ID of a mobile phone antenna, or parameters related to GPS positioning are considered as variables, it is possible that their value is not constant at all points of the facility, and therefore there are variations between some automatic access gates and others. In this case, specific sensors could be arranged for each gate or set of gates so that, during the validation process, the validity of each entry code is checked taking into account the second measurement acquired by the sensor corresponding specifically to the automatic access gate to which said entry code was shown.

On the other hand, the sensor or sensors could in principle be connected to any of the described entities or to other entities or intermediate elements as long as the measurements acquired can be directly or indirectly communicated to the validation server. Thus, according to a particularly preferred embodiment of the invention, the sensor could be connected to the validation server. Alternatively, the sensor could be connected to, or embedded in, the automatic access gate, in which case it would send the value of the second measurement of the physical variable to the validation server. In any case, the underlying concept is to send the value of said second measurement of the physical variable to the validation server, either directly (if the sensor is directly connected to the validation server) or indirectly (if the sensor is connected to the automatic access gate).

In short, this second measurement of the physical variable is taken essentially at the same moment that the spectator shows the entry code to the automatic access gate and is physically close to said automatic access gate (understanding by "close" a separation normally not greater than the maximum dimensions of the facility, whether it is a stadium, a theatre, etc.). Under these conditions, the second measurement obtained by the sensor present in the facility, whether it is a single sensor for the entire facility or a dedicated sensor for each gate, will only coincide with the first measurement obtained by the user's mobile device if both have been taken in the same facility (in the case of a single sensor) or more specifically in the surroundings of the same automatic access gate (in the case of dedicated sensors for each gate).

6. Calculation of a validation code

The validation server calculates, in the same way that the application of the mobile device calculated the entry code, a validation code corresponding to the time frame in which it receives the validation request. This validation code comprises the seed, the mobile device's identification data, and the second measurement of the physical variable.

In this context, the expression "in the same way as the application of the mobile device calculated the entry code" related to the calculation of the validation code means that the validation server carries out the calculation of the validation code using the same algorithm as the one used by the mobile device to calculate the entry code. This algorithm, therefore, is included from the start both in the application that is installed on the mobile device and in the validation server. For example, the algorithm can be part of the data of the ticket purchase and management application itself that is installed on the spectator's mobile device. Thus, if the server starts from the same initial data, the result of the calculation must have a validation code identical to the entry code generated by the application.

Regarding the validity time frame of the entry code, both the mobile device and the server used are synchronized so that the validation code generated by the validation server includes the same timestamp that the application included in the entry code. That is, the entry code and the validation code preferably include both timestamps obtained synchronously by the application of the mobile device and by the validation server. Again, the way in which this synchronization is carried out is known in the art and is therefore not described in detail herein.

That is, using the same algorithm as the application, the validation server calculates the validation code starting from the same data used by the application, since the validation server has from the first step of this method both the seed and the mobile device's identification data. Therefore, the only difference in the starting data is the measurement of the physical variable, which in this case is a second measurement taken by the sensor instead of the first measurement taken by the mobile phone. Both measurements will only match if the mobile device was sufficiently close to the sensor at the time the access code was generated, and therefore in the surroundings of the facility to which access is desired.

Ultimately, the calculated validation code will only be identical to the entry code if the mobile device showing the ticket to the automatic access gate was next to the gate at the time the access code was generated.

7. Comparison between entry code and validation code

The validation server checks if there is a coincidence between the entry code received from the automatic access gate and the validation code calculated by the validation server itself. If so, the validation server sends an access grant order to the automatic access gate. If not, the validation server sends an access denial order to the automatic access gate. The automatic access gate opens or remains closed depending on the order received from the validation server.

This method ensures that the spectator who tries to access the facility where a certain event takes place is physically at the corresponding gate, preventing any type of fraud.

In a particularly preferred embodiment of the invention, the method further comprises the step of emitting, from a beacon arranged in the facility, a signal detectable in the surroundings of all the automatic access gates to the facility. For example, it can be a Wi-Fi, radio, Bluetooth, or Bluetooth Low Energy signal emitted from a suitable point in the facility with sufficient power so that it can be detected at all access gates. This signal will constitute the physical variable used in the method of the invention, so that it can be ensured that the first measurement acquired by the spectator's mobile device and the second measurement acquired by the facility's sensor will only coincide when the spectator is within range of such specific dedicated signal, that is, when he/she is physically in the facility to which he/she intends to access.

In a preferred embodiment alternative to the previous one, the method further comprises the step of emitting, from a plurality of beacons respectively arranged in the surroundings of the automatic access gates, signals only detectable in the surroundings of an automatic access gate or in the surroundings of several automatic access gates located in the same area of the facility. That is, in this case the beacons generate a physical variable (Wi-Fi, radio, Bluetooth, or Bluetooth Low Energy, or other signal) the range of which is calculated so that it is only detectable in the surroundings of a particular automatic access gate or in the surroundings of a particular subset of gates among all the gates in the facility. By properly designing the range, number and position of the beacons, the number of signals received at each access gate would be different, which would make it possible to uniquely identify the access gate where the spectator is located.

Even more preferably, each beacon could emit a signal different from the signals emitted by the rest of the beacons. In other words, the signal emitted by each beacon could be unique and known, and its range could be calculated to reach only a single access gate or a subset of automatic access gates. Thus, if the sensor of a spectator's mobile device captures a certain signal, this necessarily implies that said mobile phone is next to the automatic access gate corresponding to the beacon that emits that signal.

In short, there are different configurations in terms of number, position and type of signal emitted by the beacons. The underlying concept is that the number and/or identification of the signals received at each gate is specific and unique for each gate, so that for an entry code to be valid it must have been generated by the user's mobile device in the surroundings of a particular automatic access gate.

This configuration is particularly advantageous because it further reduces the likelihood of access control frauds, albeit at the cost of increased complexity and installation time.

Access Control System

A second aspect of the present invention is directed to a system for controlling a spectator's access to a facility. This system includes a validation server and automatic access gates to the facility. The validation server is configured to communicate with an application installed on a spectator's mobile device, while the validation server is configured to communicate with automatic access gates.

So far the basic elements of a conventional control system have been described. However, the system of the present invention differs in that it also comprises a sensor of a physical variable that is located in the facility. As will be described in detail later herein, this sensor will be directly or indirectly connected to the validation server.

Thus, the validation server and automatic access gates are configured to carry out the following operations:

1. One of the application of the mobile device and the validation server generates a seed that constitutes a first portion of an entry code, and sends said seed to the other of the application of the mobile device and the validation server.

2. The mobile device sends identification data of the mobile device to the validation server.
3. The application of the mobile device calculates an entry code of limited time duration where the entry code comprises the seed, identification data of the mobile device and at least one first measurement of a physical variable of the environment of the mobile device obtained at that moment by means of a sensor embedded in said mobile device.
4. When the mobile device communicates the entry code to the automatic access gate to the facility, the automatic access gate sends a validation request that includes said entry code to the validation server
5. At that same moment, the sensor located in the facility performs a second measurement of the physical variable and communicates it to the validation server.
6. The validation server calculates, in the same way that the application of the mobile device calculated the entry code, a validation code corresponding to the time frame in which it receives the validation request comprising the seed, the mobile device's identification data, and the second measurement of the physical variable.
7. The validation server checks if there is a coincidence between the entry code received from the automatic access gate and the validation code calculated by the validation server itself and, if so, it sends an access grant order to the automatic access gate, while if not, it sends an access denial order to the automatic access gate.

According to a preferred embodiment, the system of the invention could comprise a single sensor located at any point of the facility to which access is sought, regardless of the number of automatic access gates.

Indeed, as described above, if a physical variable such as temperature or atmospheric pressure is considered, it can be assumed that its value will be constant at all points of the facility where the access gates to a soccer stadium are located. That is, the value of the first temperature or pressure measurement taken by the spectator's mobile device in the surroundings of a certain automatic access gate will coincide with the value of the second temperature or pressure measurement taken by the sensor located at another point in the facility but not necessarily in the surroundings of said automatic access gate. Therefore, in this case, a single sensor would suffice to check the validity of the entry codes shown through all the automatic access gates to the facility.

Alternatively, several sensors could be used, each of which is arranged in the surroundings of a corresponding automatic access gate or in the surroundings of a set of automatic access gates located in the same area of the facility. In this context, the surroundings of a gate refers to a distance around said gate within which the spectator predictably opens the mobile device application to show the code to the gate when he/she is going to access the facility. For example, the surroundings of a gate can cover a maximum distance from the access gate of a few meters, preferably less than 10 meters, more preferably less than 5 meters, and even more preferably less than 2 meters.

As described above this ensures that, in the case of certain limited-range physical variables, the second measurement obtained by the sensor corresponding to an automatic access gate when the spectator shows the entry code to the gate coincides with the first measurement made by the spectator's mobile device located next to the automatic access gate when opening the application a few seconds before. Again, it is understood that both the physical variable and the degree of precision of the measurement (for example, number of significant figures of the measurement) will be selected in such a way as to ensure the coincidence between both measurements when these are taken from points not separated by more than a few meters.

According to a particularly preferred embodiment of the invention, the sensor could be connected to the validation server. Alternatively, the sensor could be connected to, or even more preferably embedded in, the automatic access gate, in which case it would send the value of the second measurement of the physical variable to the validation server. In any case, the underlying concept consists of sending the value of said second measurement of the physical variable to the validation server, either directly (if the sensor is directly connected to the validation server) or indirectly (if the sensor is connected to the automatic access gate).

According to another preferred embodiment of the system of the invention, the sensor comprises at least one of the following: a Wi-Fi range receiver, a radio signal receiver, a Bluetooth range receiver, a Bluetooth Low Energy range receiver, a mobile phone signal receiver, a GPS positioning sensor, an atmospheric pressure sensor, a wind speed sensor, a temperature sensor, a humidity sensor, an air conductivity sensor, an air salinity sensor, a gravity sensor, an altitude sensor, an acoustic intensity sensor, a biometric sensor, an orientation sensor, a luminosity sensor, an infrared spectrum sensor, an air quality sensor, and a vibration sensor.

In another particularly preferred embodiment of the invention, the method further comprises the step of emitting, from a beacon arranged in the facility, a signal detectable in the surroundings of all the automatic access gates to the facility. For example, it can be a Wi-Fi, radio, Bluetooth, or Bluetooth Low Energy signal emitted from a suitable point in the facility with sufficient power so that it can be detected at all access gates. This signal would constitute the physical variable used in the system, which would make it possible to ensure that the first measurement acquired by the spectator's mobile device and the second measurement acquired by the facility's sensor will only coincide when the spectator is within range of such specific dedicated signal, that is, when he/she is physically in the facility to which he/she intends to access.

In a preferred embodiment alternative to the previous one, the method further comprises the step of emitting, from a plurality of beacons respectively arranged in the surroundings of the automatic access gates, signals only detectable in the surroundings of an automatic access gate or in the surroundings of several automatic access gates located in the same area of the facility. That is, in this case the beacons generate a physical variable (Wi-Fi, radio, Bluetooth, or Bluetooth Low Energy, or other signal) the range of which is calculated so that it is only detectable in the surroundings of a particular automatic access gate or in the surroundings of a particular subset of gates among all the gates in the facility. In this case, an adequate design of the range, number and position of the beacons would allow the unique identification of the access gate where the spectator is located, since the number of signals received at each access gate would be different.

Even more preferably, each beacon could emit a signal different from the signals emitted by the rest of the beacons. In other words, the signal emitted by each beacon would be unique and known, and its range would be calculated to reach only a single access gate or a subset of automatic access gates. Thus, if the sensor of a spectator's mobile device captures a certain signal, this necessarily implies that said mobile phone is next to the automatic access gate corresponding to the beacon that emits that signal.

PREFERRED EMBODIMENT OF THE INVENTION

A particular example of the present invention is described below with reference to the attached figures.

Figure 1:
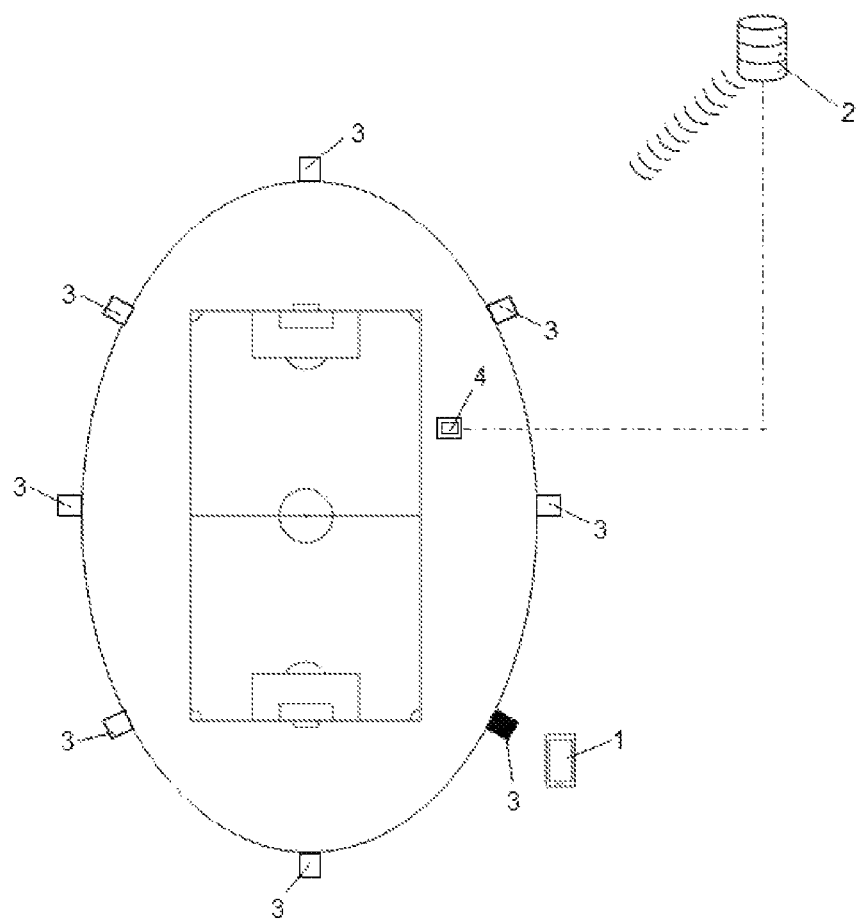
FIG. 1 shows a schematic view of the elements that make up an access control system according to the present invention.

FIG. 1 schematically shows an access control system installed in a soccer stadium to control access to a soccer match. This stadium has eight gates, in each of which an automatic access gate (3) is installed. In addition, at a point of the stadium located outdoors, a sensor (4) is installed, in this example a temperature and humidity sensor.

Figure 2:
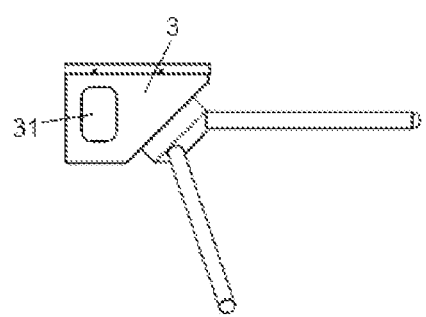
FIG. 2 shows a schematic view of an automatic access gate according to the present invention.

As can be seen in FIG. 2, in this example each automatic access gate (3) is turnstile having has three bars fixed to a rotating portion, so that operating the rotating portion at a predetermined angle causes a displacement of the bars that allows the passage of a single person. This turnstile (3) also has an optical reader (31) for reading QR codes. It is, therefore, a completely conventional turnstile (3) of the type currently used to control the entry to many stadiums.

A validation server (2) in communication with the turnstiles (3) and connected to the temperature and humidity sensor (4) is located in a remote location. As described above herein, the validation server (2) may not be a single physical element, but may be divided into several parts due to technical or commercial reasons. For example, the validation server (2) can be made up of a first sub-server belonging to a first entity in communication with a second sub-server belonging to a second entity. Each of such sub-servers can have other additional elements connected to it, such as databases or other elements for specific use. The connections between the different elements that make up the validation server (2) as well as between the validation server (2) and the turnstiles (3) will be carried out using any means of communication, wired or wireless, known in the art. In either case, the set of elements described operates in a coordinated manner to carry out the operations described herein, and for reasons of conciseness they are simply referred to as "validation server (2)".

FIG. 1 also shows a mobile device (1), which in this case is a mobile phone. The mobile phone (1) will have installed a specific application for the purchase and management of tickets. This application can be downloaded conventionally in existing application stores. The application is configured to make the mobile phone (1) carry out the different operations described herein, as will be described in greater detail below. In particular, the application includes the algorithm that the mobile phone (1) will use later to generate the entry code (EC) to the stadium. In addition, during this process of installing the application, the mobile phone (1) sends identification data of said mobile phone to the validation server (2), such as the phone number itself (N), the IMSI, the IMEI, or any combination thereof. The mobile device (1) will naturally also have at least one temperature sensor and one humidity sensor.

Figure 3A:
FIGS. 3A-3E schematically show some steps of the access control method according to the present invention.

Next, the access control method of the present invention will be described with reference to FIGS. 3 and 4. First, as shown in FIG. 3A, the spectator purchases a ticket through the application installed on the mobile phone (1). To do this, the spectator first carries out an authentication process to access the purchase area of the application and then selects the seat and makes the corresponding payment.

Figure 3B:
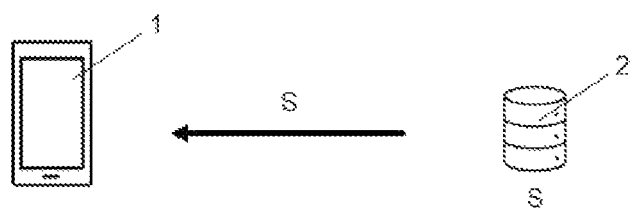

Then, as schematically shown in FIG. 3B, the validation server (2) uses a predetermined algorithm to generate a seed (S) which it sends to the mobile phone (1). At this moment, therefore, both the mobile phone (1) and the validation server (2) have stored both the seed (S) and the identification data (N, IMSI, and/or IMEI) of said mobile phone (1).

Figure 3C:
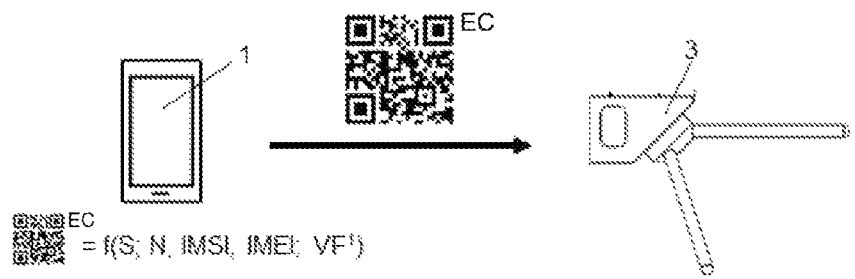

Subsequently, for example days, weeks, or even months later, the spectator travels to the stadium to attend the game. When he/she approaches the queue, he/she opens the application to show the entry code (EC) to the reader (31) of the access turnstile (3). As shown in FIG. 1, the spectator, and therefore also the mobile phone (1), is naturally close to the turnstile (3) for specific access to the gate through which he/she is going to enter the stadium. At that time, as schematically shown in FIG. 3C, the application of the mobile phone (1) uses the aforementioned algorithm to perform calculation of an entry code (EC) on the basis of the seed (S), the identification data (N, IMSI, and/or IMEI) of the mobile phone (1), and a first measurement ($PV^1$) of the aforementioned physical variables that is carried out at that moment using one of the sensors embedded in the mobile phone (1). Thus, the physical variables used to generate the entry code (EC) are the temperature and humidity at that specific time and in that specific place. The entry code (EC) can, for example, look like the following:

1234567890 123456 658844991 04032021 1600 28 225

Entry No. | IMEI | Phone No. | Date | Time | Temp. (° C.) | Humidity (%)

Figure 3D:
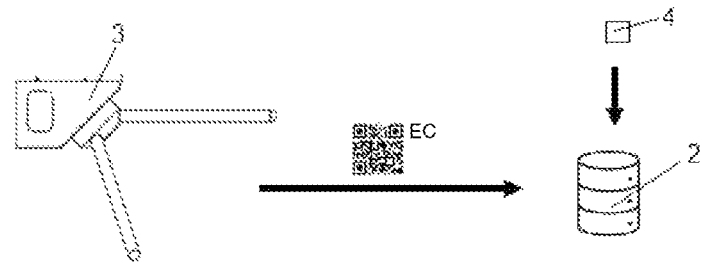
Figure 3E:
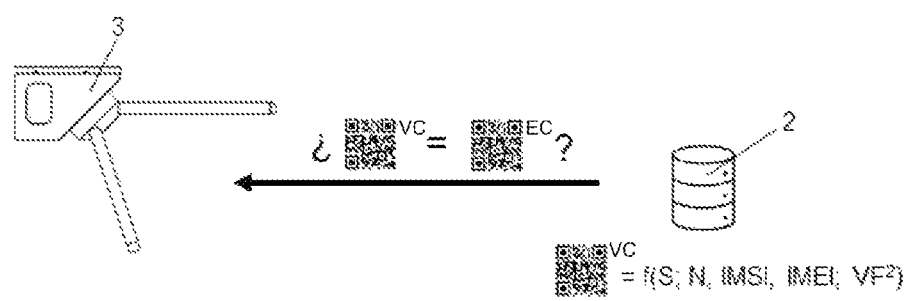

This process is, in the eyes of the spectator, immediate. The entry code (EC) appears on the screen and the spectator shows it to the optical reader (31) of the access turnstile (3). As shown in FIG. 3D, once the entry code (EC) has been read, the turnstile (3) sends said entry code (EC) to the validation server (2).

The time elapsed between the generation of the entry code (EC) and the moment in which it is read by the access turnstile (3) is only a few seconds. In the event that the spectator opens the application to generate the code earlier, the process of calculating successive time-limited entry codes (EC) by adding timestamps will ensure that the code that is finally displayed to the turnstile (3) has not been generated earlier than the seconds-long of each code, and therefore the first measurement ($PV^1$) of the physical variable has been made close to the turnstile (3).

At the same time, when the spectator shows the entry code to the reader (31) of the access turnstile (3), the sensor (4) receives an order to carry out a second measurement ($PV^2$) of the same physical variables, that is, the temperature and humidity at that moment. For the reasons explained in the previous paragraph, in the absence of fraud, the time elapsed since the application of the mobile phone (1) took the first measurement ($PV^1$) of the physical variable is only a few seconds, so that the distance between the place where the spectator was at that moment and the sensor (4) is supposed to be small enough so that there are no significant variations in temperature and humidity for that reason. Therefore, the second temperature and humidity measurement ($PV^2$) carried out by the sensor (4) located somewhere in the stadium will provide the same result as the first measurement ($PV^1$) carried out by the application of the mobile phone (1) next to the turnstile (3). As seen in FIG. 3D, since the temperature and humidity sensor (4) is connected to the validation server (2), the temperature and humidity data immediately reach said validation server (2).

Therefore, at this point in the method, the validation server (2) has stored the seed (S), the identification data (N, IMSI, and/or IMEI) of the spectator's mobile phone (1), and the value of the temperature and humidity measurement obtained by the sensor (4). The validation server (2) also knows the algorithm for calculating the entry code (EC). As shown schematically in FIG. 3E, using this algorithm, the seed (S), the data (N, IMSI, and/or IMEI) of the mobile phone (1), and the second temperature and humidity measurement ($PV^2$), the validation server (2) calculates a validation code (VC). This validation code (VC) will coincide with the entry code (EC) only if the second temperature and humidity measurement ($PV^2$) is the same as the first temperature and humidity measurement ($PV^1$), that is, if and only if the spectator was close enough to the stadium, for example next to the turnstile (3), when the entry code (EC) was generated by the application.

The validation server (2) then compares the entry code (EC) with the validation code (VC). If they are the same, it sends an opening order to the turnstile (3) to allow the spectator to access. If they are not the same, it sends an order to the turnstile (3) to keep the spectator's way closed.

Figure 4:
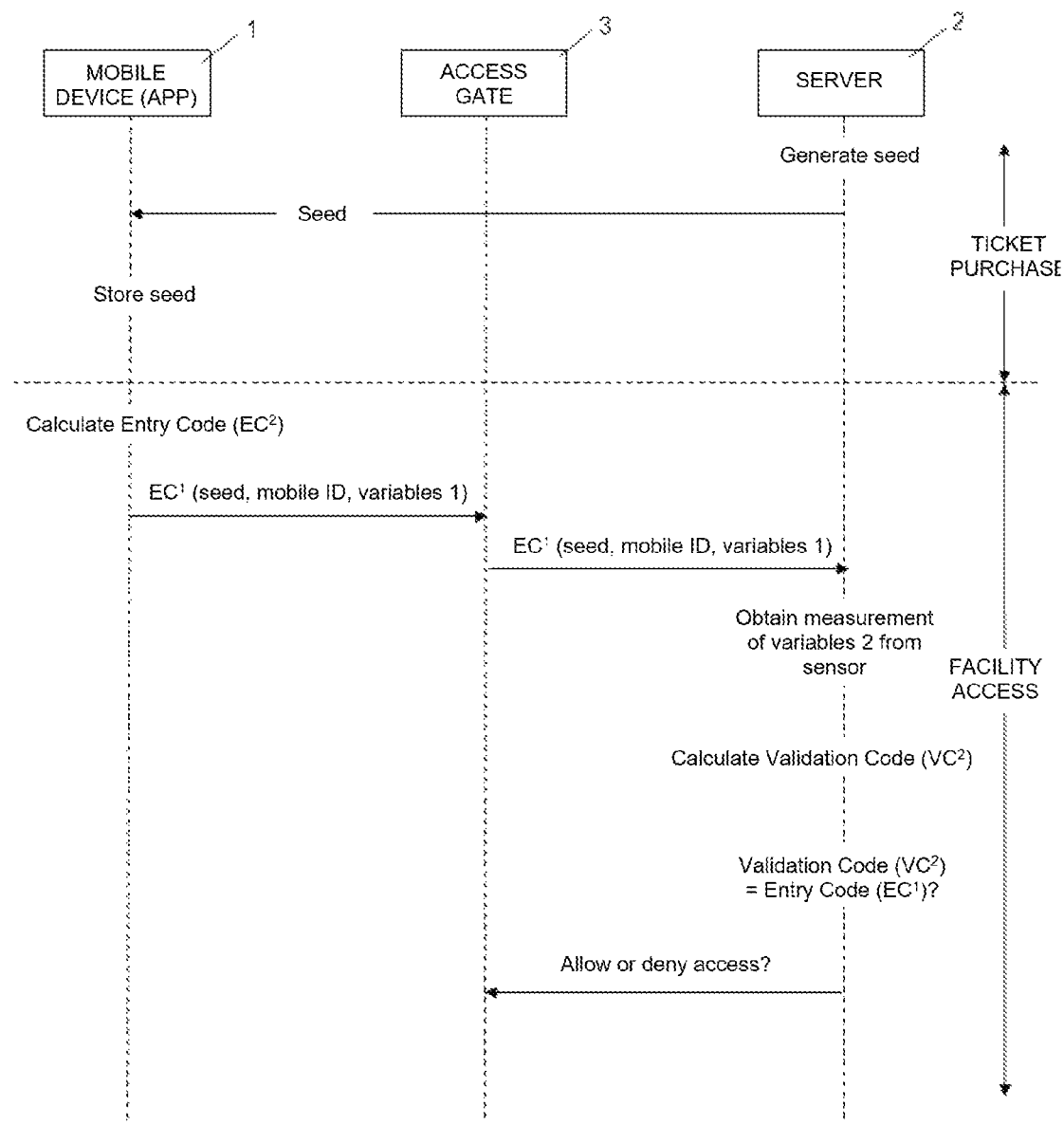
FIG. 4 shows a schematic schedule of the access control method of the present invention.

FIG. 4 is a schematic schedule showing the different communications that occurs between the different elements of the system when the method described in the previous paragraphs is carried out.

The invention claimed is:
1. Access control method for a spectator to a facility, wherein a spectator's mobile device (1) has installed an application configured to communicate with a validation server (2), and wherein said validation server (2) is configured to communicate with some automatic access gates (3) to the facility,
characterized by comprising the following steps:
one of the application of the mobile device (1) and the validation server (2) generates a seed(S) that constitutes a first portion of an entry code (EC), and sends said seed(S) to the other of the application of the mobile device (1) and the validation server (2);
the mobile device (1) sends identification data (N, IMSI, IMEI) of the mobile device (1) to the validation server (2);
the application of the mobile device (1) calculates an entry code (EC) of limited time duration, where the entry code (EC) comprises the seed(S), identification data (N, IMSI, IMEI) of the mobile device (1) and at least one first measurement of a physical variable ($PV^1$) of the environment of the mobile device (1) obtained at that moment by means of a sensor embedded in said mobile device (1);
when the mobile device (1) communicates the entry code (EC) to the automatic access gate (3) to the facility, the automatic access gate (3) sends a validation request that includes said entry code (EC) to the validation server (2);
at that same moment, a sensor (4) located in the facility performs a second measurement of the physical variable ($PV^2$) and communicates it to the validation server (2);
the validation server (2) calculates, in the same way that the application of the mobile device (1) calculated the entry code (EC), a validation code (VC) corresponding to the time frame in which it receives the validation request comprising the seed(S), the identification data (N, IMSI, IMEI) of the mobile device (1), and the second measurement of the physical variable ($PV^2$); and
the validation server (2) checks if there is a coincidence between the entry code (EC) received from the automatic access gate (3) and the validation code (VC) calculated by the validation server (2) itself and, if so, it sends an access grant order to the automatic access gate (3), while if not, it sends an access denial order to the automatic access gate (3).

2. Access control method according to claim 1, wherein the physical variable (PV) comprises at least one of the following: identified Wi-Fi, signal strength emitted by a radio device, signal strength emitted by a Bluetooth device, signal strength emitted by a Bluetooth Low Energy device, cell ID of a mobile phone antenna, GPS positioning coordinates, GPS positioning quadrant, visible satellites used in GPS positioning, atmospheric pressure, wind speed, temperature, humidity, air conductivity, air salinity, gravity, altitude, acoustic intensity, biometrics, orientation, luminosity, infrared spectrum, air quality, and vibrations.

3. Access control method according to claim 2, further comprising the step of emitting, from a beacon arranged in the facility, a signal detectable in the surroundings of all the automatic access gates (3) to the facility.

4. Access control method according to claim 2, further comprising the step of emitting, from a plurality of beacons arranged in the surroundings of the automatic access gates (3), signals only detectable in the surroundings of a single automatic access gate (3) or in the surroundings of several automatic access gates (3) located in the same area of the facility.

5. Access control method according to claim 4, wherein each beacon emits a signal different from the signals emitted by the rest of the beacons.

6. Access control method according to claim 5, comprising including in the entry code (EC) and the validation code (VC) both timestamps obtained synchronously by the application of the mobile device (1) and by the validation server (2).

7. Access control method according to claim 6, wherein the communication between the application of the mobile device (1) and the automatic access gate (3) comprises at least one of the following: QR, NFC, Bluetooth, Bluetooth Low Energy, Wi-Fi, IP, and infrared.

8. Access control system (1) for a spectator to a facility, comprising a validation server (2) and automatic access gates (3) to the facility, wherein the validation server (2) is configured to communicate with an application installed on a spectator's mobile device (1), and wherein the validation server (2) is configured to communicate with the automatic access gates (3),
characterized in that
it also includes a sensor (4) of a physical variable located in the facility, and in that the validation server (2) and the automatic access gates (3) are configured to carry out the following operations:

one of the application of the mobile device (1) and the validation server (2) generates a seed(S) that constitutes a first portion of an entry code (EC), and sends said seed(S) to the other of the application of the mobile device (1) and the validation server (2);

the mobile device (1) sends identification data (N, IMSI, IMEI) of the mobile device (1) to the validation server (2);

the application of the mobile device (1) calculates an entry code (EC) of limited time duration, where the entry code (EC) comprises the seed(S), identification data (N, IMSI, IMEI) of the mobile device (1) and at least one first measurement of a physical variable (PV1) of the environment of the mobile device (1) obtained at that moment by means of a sensor embedded in said mobile device (1);

when the mobile device (1) communicates the entry code (EC) to the automatic access gate (3) to the facility, the automatic access gate (3) sends a validation request that includes said entry code (EC) to the validation server (2);

at that same moment, the sensor (4) located in the facility performs a second measurement of the physical variable (PV2) and communicates it to the validation server (2);

the validation server (2) calculates, in the same way that the application of the mobile device (1) calculated the entry code (EC), a validation code (VC) corresponding to the time frame in which it receives the validation request comprising the seed(S), the identification data (N, IMSI, IMEI) of the mobile device (1), and the second measurement of the physical variable (PV2); and the validation server (2) checks if there is a coincidence between the entry code (EC) received from the automatic access gate (3) and the validation code (VC) calculated by the validation server (2) itself and, if so, it sends an access grant order to the automatic access gate (3), while if not, it sends an access denial order to the automatic access gate (3).

9. Access control system (1) according to claim 8, comprising a single sensor (4) located at any point of the facility.

10. Access control system (1) according to claim 8, comprising several sensors (4), each of which is arranged in the surroundings of a particular automatic access gate (3) or in the surroundings of a set of automatic access gates (3) located in the same area of the facility.

11. Access control system (1) according to claim 10, wherein the sensor (4) is arranged within a radius of less than 10 meters from the automatic access gate (3).

12. Access control system (1) according to claim 11, wherein the sensor (4) is arranged within a radius of less than 5 meters from the automatic access gate (3).

13. Access control system (1) according to claim 12, wherein the sensor (4) is arranged within a radius of less than 2 meters from the automatic access gate (3).

14. Access control system (1) according to claim 13, wherein the sensor (4) is connected to the validation server (2).

15. Access control system (1) according to claim 13, wherein the sensor (4) is connected to the automatic access gate (3), and is embedded in the automatic access gate (3) itself.

16. Access control system (1) according to claim 15, wherein the sensor (4) comprises at least one of the following: a Wi-Fi range receiver, a radio signal receiver, a Bluetooth range receiver, a Bluetooth Low Energy range receiver, a mobile phone signal receiver, a GPS positioning sensor, an atmospheric pressure sensor, a wind speed sensor, a temperature sensor, a humidity sensor, an air conductivity sensor, an air salinity sensor, a gravity sensor, an altitude sensor, an acoustic intensity sensor, a biometric sensor, an orientation sensor, a luminosity sensor, an infrared spectrum sensor, an air quality sensor, and a vibration sensor.

17. Access control system (1) according to claim 16, further comprising a beacon arranged in the facility that emits a signal detectable in the surroundings of all the automatic access gates (3) to the facility.

18. Access control system (1) according to claim 16, further comprising a plurality of beacons respectively arranged in the surroundings of the automatic access gates (3), wherein each beacon emits a signal that is only detectable in the surroundings of a single automatic access gate (3) or in the surroundings of several automatic access gates (3) located in the same area of the facility.

19. Access control system (1) according to claim 18, wherein each beacon emits a signal different from the signals emitted by the rest of the beacons.

20. Access control system (1) according to claim 19, wherein the automatic access gate (3) comprises at least the following means of communication with the application of the mobile device ( ): QR, NFC, Bluetooth, Bluetooth Low Energy, Wi-Fi, IP, and infrared.

* * * * *